US012697847B2

(12) United States Patent
Lusso et al.

(10) Patent No.: US 12,697,847 B2
(45) Date of Patent: Aug. 4, 2026

(54) SHOCK ABSORBER ASSEMBLY WITH ADJUSTABLE HEIGHT

(71) Applicant: VRM S.P.A., Zola Predosa (IT)

(72) Inventors: Niko Lusso, Zola Predosa (IT); Marco Montenegro, Zola Predosa (IT)

(73) Assignee: VRM S.P.A., Zola Predosa (IT)

( * ) Notice: Subject to any disclaimer, the term of this patent is extended or adjusted under 35 U.S.C. 154(b) by 1087 days.

(21) Appl. No.: 17/770,547

(22) PCT Filed: Oct. 21, 2020

(86) PCT No.: PCT/IB2020/059899
§ 371 (c)(1),
(2) Date: Apr. 20, 2022

(87) PCT Pub. No.: WO2021/079288
PCT Pub. Date: Apr. 29, 2021

(65) Prior Publication Data
US 2022/0379677 A1      Dec. 1, 2022

(30) Foreign Application Priority Data

Oct. 21, 2019      (IT) ........................ 102019000019439

(51) Int. Cl.
B60G 15/06          (2006.01)
B60G 17/027          (2006.01)
(Continued)

(52) U.S. Cl.
CPC ....... B60G 15/063 (2013.01); B60G 17/0272 (2013.01); B62K 25/04 (2013.01);
(Continued)

(58) Field of Classification Search
CPC ........... B60G 2202/312; B60G 15/063; B60G 2204/1242; B60G 15/062; B60G 15/068;
(Continued)

(56) References Cited

U.S. PATENT DOCUMENTS 2,904,343 A * 9/1959 Taber ................... B60G 17/027
267/221
3,752,498 A * 8/1973 Shea ...................... B60G 17/04
280/124.159
(Continued)

FOREIGN PATENT DOCUMENTS

DE      102014207055 A1      9/2015
DE      102018000149 A1 *   7/2019  ........... B60G 17/019
(Continued)

OTHER PUBLICATIONS

WO 2006006848 A2 (Jan. 19, 2006) (Year: 2006).*
(Continued)

*Primary Examiner* — David R Morris
*Assistant Examiner* — Mahbubur Rashid
(74) *Attorney, Agent, or Firm* — Tutunjian & Bitetto, P.C.

(57) ABSTRACT

A shock absorber assembly with adjustable height for two-wheeled motor vehicles and the like, including a shock absorber with a spring, e.g. a helical spring coaxial to the shock absorber, the shock absorber having a nominal length (L) and at least two couplings operatively connected to the suspension of the vehicle, the spring having a first end and a second end; the shock absorber assembly includes at least one hydraulic fluid pusher installed in series with the spring, the pusher acts on either end of the spring or the pusher acts on either coupling, a source of pressurise hydraulic fluid in fluid connection with the pusher and to actuate the pusher, the shock absorber assembly includes an accumulator tank assembly in fluid connection with the pusher, the accumulator tank assembly in turn includes one tank and a solenoid valve.

9 Claims, 2 Drawing Sheets

(51) Int. Cl.
   *B62K 25/04*         (2006.01)
   *F16F 13/00*         (2006.01)

(52) U.S. Cl.
   CPC ...... *F16F 13/007* (2013.01); *B60G 2202/154*
       (2013.01); *B60G 2202/413* (2013.01); *B60G*
       *2300/12* (2013.01); *B62K 2025/045* (2013.01)

(58) Field of Classification Search
   CPC .............. B60G 15/06; B60G 2204/61; B60G
          2500/30; B60G 11/14; B60G 2202/31;
          B60G 2202/413; B60G 2300/12; B60G
          2202/42; B60G 2202/32; B60G 2204/62;
          B60G 17/00; B60G 2206/42; B60G
          2206/911; B60G 13/06; B60G 2204/12;
          B60G 7/003; B60G 11/27; B60G
          17/0157; B60G 2202/30; B60G 2202/442;
          B60G 2800/914; B60G 2202/422; B60G
          2206/1116; B60G 2600/21; B60G
          17/0272; B60G 2202/154; F16F 13/007;
          F16F 13/00; F16F 9/56; F16F 1/121;
          B62K 25/04; B62K 2025/045
   See application file for complete search history.

(56)            References Cited

U.S. PATENT DOCUMENTS

| | | | | |
|---|---|---|---|---|
| 4,830,395 A | * | 5/1989 | Foley | ................. B60G 17/0272 |
| | | | | 280/124.162 |
| 5,022,501 A | * | 6/1991 | Hayashi | ............. B60G 17/0272 |
| | | | | 188/300 |
| 5,058,868 A | * | 10/1991 | Sirven | ...................... F16F 9/06 |
| | | | | 267/152 |
| 5,086,866 A | * | 2/1992 | Banjo | ................... B60G 17/033 |
| | | | | 180/219 |
| 5,181,696 A | * | 1/1993 | Abe | ........................ B62K 25/04 |
| | | | | 267/221 |
| 5,201,384 A | * | 4/1993 | Kiyota | ................. B60G 21/023 |
| | | | | 180/219 |
| 8,408,561 B2 | * | 4/2013 | Mochizuki | ........... B60G 17/027 |
| | | | | 280/124.16 |
| 8,770,594 B2 | * | 7/2014 | Tominaga | .............. B62K 25/26 |
| | | | | 188/297 |
| 8,888,107 B2 | * | 11/2014 | Murakami | ........... B60G 17/021 |
| | | | | 280/6.157 |
| 9,180,746 B2 | * | 11/2015 | Kasuga | ................ B60G 17/015 |
| 2017/0077465 A1 | | 3/2017 | Taniguchi et al. | |
| 2019/0031263 A1 | * | 1/2019 | Tomura | .................. B62K 25/04 |

FOREIGN PATENT DOCUMENTS

| | | | | |
|---|---|---|---|---|
| EP | 2301773 A1 | * | 3/2011 | ......... B60G 17/0408 |
| EP | 3225527 A1 | | 10/2017 | |
| EP | 3024675 A1 | | 3/2018 | |
| EP | 3024675 B1 | * | 3/2018 | ............. B60G 11/16 |
| JP | 2001182771 A | * | 7/2001 | |
| JP | 2007030665 A | * | 2/2007 | |
| JP | 4726077 B2 | * | 7/2011 | |
| JP | 6683658 B2 | * | 4/2020 | ................ B62J 1/06 |
| WO | WO-9615005 A1 | * | 5/1996 | ............. B60G 11/56 |
| WO | 2008038321 A1 | | 4/2008 | |

OTHER PUBLICATIONS

DE 102005008814 A1 (Sep. 7, 2006) (Year: 2006).*
CN 102026835 B (Aug. 21, 2013) (Year: 2013).*
CN 104428199 B (Nov. 17, 2017) (Year: 2017).*
International Search Report for PCT/IB2020/059899 dated Feb. 19, 2021 (3 pages).

* cited by examiner

SHOCK ABSORBER ASSEMBLY WITH ADJUSTABLE HEIGHT

TECHNICAL FIELD OF THE INVENTION

The present invention refers to a shock absorber assembly with adjustable height, in particular a shock absorber assembly that allows a quick lowering of the vehicle, usable in the field of two-wheeled motor vehicles and the like, i.e. two-, or three-, or four-wheels motor leaning vehicle, for example sidecars or lightweight vehicles with three or four wheels of the leaning type in corners, although more generally it may refer to motor vehicles of any type equipped with height-adjustable suspension.

DESCRIPTION OF RELATED ART

In the field of two-wheeled motor vehicles and the like, the need to adjust the height of the seat according to the condition of use as well as the load condition is increasingly felt. Some of the current two-wheeled motor vehicles, for example motorcycles in the enduro segment or the so-called crossover vehicles, need a rather high stance to cope with the off-road use of the vehicle, but at the same time, this is in contrast with the need to be able to handle the vehicle easily in all low-speed situations where the driver's feet need to be rested on the ground.

To respond to these needs, the latest generation motorcycles in the enduro/crossover segment are almost all equipped with suspension adjustment devices to compensate for the on-board load and allow a personalized adjustment of the seat height.

Suspension adjustment is therefore used in a more or less dynamic way, depending on the level of complexity of the control system present on the vehicle.

In known types of electro-hydraulically operated adjustment devices, in order to obtain faster suspension adjustment times it is necessary to increase the power of the drive motor of the hydraulic pump, however, this is in contrast with the electric power limit available on a two-wheeled vehicle or the like, for example a motorcycle.

Due to this power requirement, it follows that the speed of actuation of the seat raising system is strictly limited by the electric power of the vehicle and similarly, also the speed during lowering is limited.

Documents EP3024675A1 and WO 2008/038321 A1 describe height adjustable shock absorbers which use an electro-hydraulic device comprising a pusher unit which acts on the spring, increasing or decreasing the spring preload of the shock absorber and consequently varying the height of the vehicle on which the shock absorber is mounted, or the pusher unit acts on one end of the shock absorber near one of the shock absorber couplings to the vehicle, directly increasing or decreasing the length of the shock absorber, and an electrically motorized hydraulic pump is also provided which feeds oil under pressure to the pusher unit.

In the device illustrated in EP3024675A1, the pusher unit is single-acting and the hydraulic pump can be of the double-acting or single-acting type, while in the device illustrated in WO 2008/038321 A1, the pusher unit is double-acting and for oil delivery, a pressurized oil accumulator is provided which is filled at regular intervals by means of a single-acting pump, taking oil from a low pressure tank.

The type of devices described above, in addition to being relatively complex, is unable, in particular, to achieve a quick lowering of the vehicle, due to the limited electrical power of the pump motor and/or of the hydraulic components used.

In fact, in the case of the double-acting hydraulic pump, the electric power of the motor that drives the pump is not high enough to allow for quick movement of the pusher unit and, in the case of the single-acting hydraulic pump, the two-way and two positions solenoid valve, when used for draining the oil from the pusher unit, has relatively small oil ports, not allowing large oil flow rates and practically creating in actual fact a bottleneck choking the oil flow.

It should be considered that the ideal option would be to have, especially during lowering, a full displacement time of the pusher assembly measurable in tenths of a second, while with the devices mentioned here above, the displacement time of the pusher assembly is around ten seconds.

Documents U.S. Pat. No. 5,181,696A, US2014/0077465A1 and EP3225527A1 describe height-adjustable shock absorbers that use pumping elements provided in the suspension itself to obtain the pressurised fluid used for vehicle height adjustment.

To achieve the pressure in the fluid that is needed for vehicle height adjustment, it is therefore necessary for the suspension of the vehicle to perform a certain number of oscillations, and consequently, height adjustment is not immediate and may even require a relatively long time.

Document DE102014207055 A1 describes a suspension system for a vehicle comprising a mechanical spring and a hydropneumatic spring which has a hydraulic volume that can be adjusted by means of a pneumatic container element; in order to lower the suspension, the volume of the hydropneumatic spring is emptied by means of a choked valve: this results in a rather long volume emptying time of the hydropneumatic spring and therefore, also an equally long suspension lowering time.

SUMMARY OF THE INVENTION

The technical scope of the present invention is to improve the state of the art in the field of height adjustable shock absorbers.

Another object of the present invention is to make a shock absorber assembly available with adjustable height which has shorter vehicle lowering times than the known solutions. A further object of the present invention is to make a shock absorber assembly available with adjustable height which can be easily installed with little space available on board as is the case, in particular, with two-wheeled motor vehicles and the like.

Yet another object of the present invention is to provide a height adjustable shock absorber assembly which is made with components that are lightweight and low cost to manufacture.

Another object of the present invention is to provide a height-adjustable shock absorber assembly which requires low electrical power to be operated in the lowering phase. According to an aspect of the present invention, a shock absorber assembly with adjustable height according to the present application is proposed.

According to another aspect of the present invention, a kit for updating or retrofitting a shock absorber with adjustable height according to the present application is proposed.

According to yet another aspect of the present invention, a method for operating a shock absorber with adjustable height according to the present application is proposed.

The present application refers to preferred and advantageous embodiments of the invention.

BRIEF DESCRIPTION OF DRAWINGS

Further aspects and advantages of the present invention will become clearer from the following detailed description of some examples of its embodiment, illustrated as an example only and not by way of limitation in the accompanying drawings, in which.

DETAILED DESCRIPTION OF THE INVENTION

Figure 1:
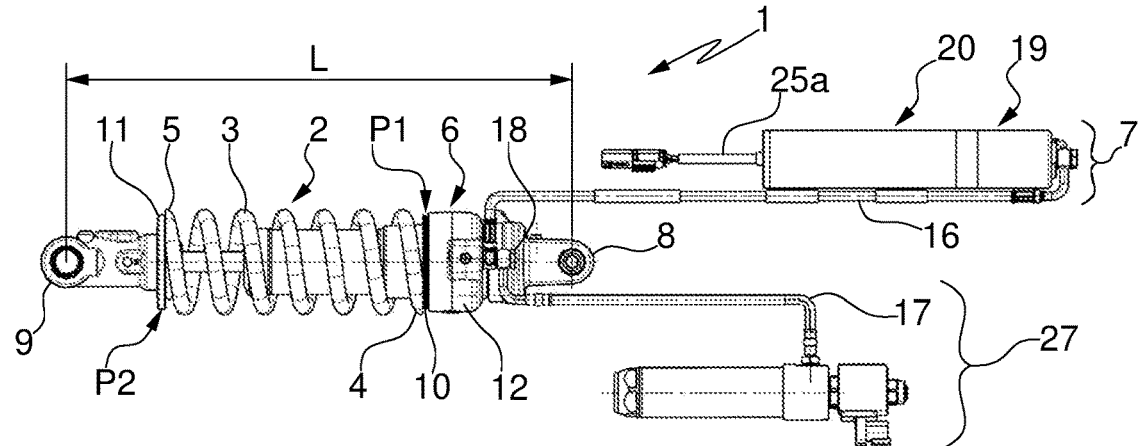
FIG. 1 is a schematic front view of a shock absorber assembly with adjustable height according to the present invention.

With reference to a version of the present invention, FIG. 1 illustrates a shock absorber assembly with adjustable height indicated as a whole with 1, which can be installed in a two-wheeled vehicle (not shown), or a sidecar or a three or four-wheeled lightweight vehicle of the leaning type in corners.

The shock absorber assembly with adjustable height 1, in the version illustrated in FIG. 1, essentially comprises a shock absorber 2 with at least one spring 3, e.g. a helical spring coaxial with the shock absorber 2, the spring 3 having a first end 4 and a second end 5, at least one hydraulic fluid type pusher 6 also coaxial with the shock absorber 2 and installed in series with the spring 3, the pusher 6 acting on either one of the two ends 4, 5 of the spring 3 and a source 7 of pressurised hydraulic fluid to actuate the pusher 6.

It should be noted that the shock absorber assembly with adjustable height according to the present invention can also be applied to different types of suspension, for example to a telescopic fork for a motorcycle, in which case, the pusher can be installed in series with each spring inside the fork sliders, but it need not always be coaxial to the shock absorber, so it can also be configured as an actuator comprising a standard hydraulic cylinder. i.e. non-annular, single-acting.

The shock absorber 2 has a nominal length L and comprises at least two couplings 8, 9 operatively connected to the vehicle suspension.

The shock absorber 2 also has a first support base 10 located in a first support position PI and a second support base 11 located in a second support position P2; the spring 3 has the first end 4 resting in the first position PI on the first support base 10 of the shock absorber 2 and the second end 5 resting in the second position P2 on the second support base 11 of the shock absorber 2.

The pusher 6 can modify the supporting position PI or P2 of one of the ends 4 or 5 of the spring 3; in particular in the version of FIG. 1, the pusher assembly 6 is positioned in contact with and acts on the first end 4 of the spring 3, changing the first supporting position PI of the first end 4 of the spring 3.

It should be noted that alternatively, the pusher 6 could be in contact and act on the second end 5 of the spring 3 by changing the second position P2 of the second end 5 of the spring 3; possibly two pushers 6 could be provided to vary both supporting positions PI, P2 of the spring 3.

By changing the supporting position PI, or the supporting position P2, or both supporting positions PI, P2, the preload of spring 3 is changed: the initial preload can be increased or the initial preload can be decreased or cancelled.

Consequently, the height of the shock absorber group 1, and more generally the height of the vehicle, on which the aforementioned group 1 is mounted, can be changed: by increasing the preload of the spring 3, the height of the vehicle practically increases because the sinking of the suspension under load due to the vehicle's own weight and to loads applied to the vehicle decreases, by decreasing (or cancelling) the preload of the spring 3, the height of the vehicle practically decreases because the sinking of the suspension under load increases.

Figure 2:
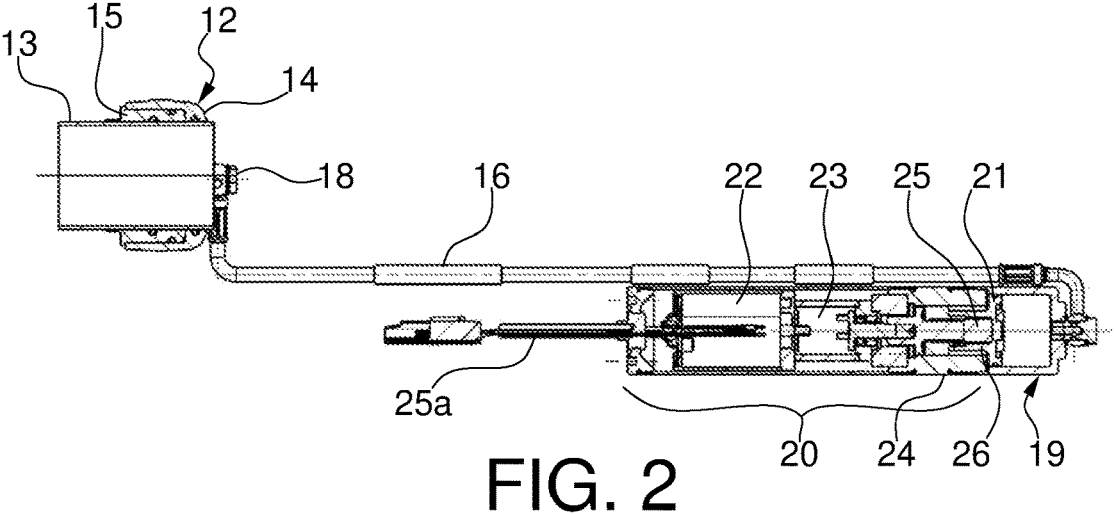
FIG. 2 is a cross-section view of some details of the shock absorber assembly with adjustable height referred to in FIG. 1.
Figure 3:
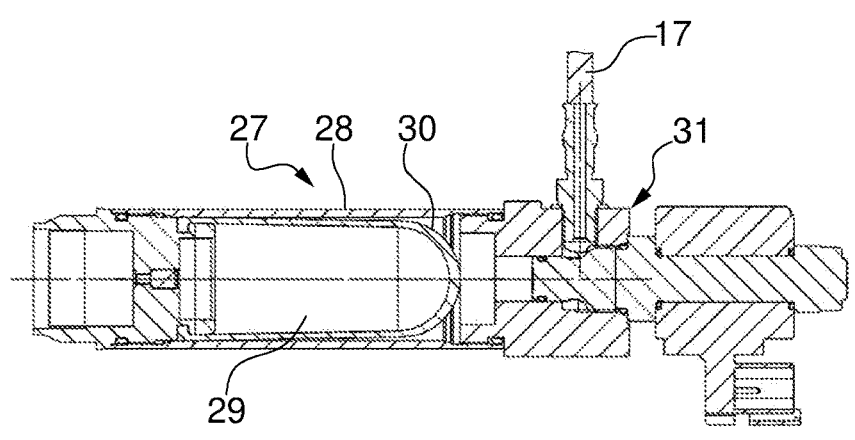
FIG. 3 is a cross-section view of another detail of the shock absorber assembly with adjustable height referred to in FIG. 1.

The pusher 6 comprises a hydraulic actuator driven by means of the source 7 of pressurised hydraulic fluid; in FIGS. 1 and 2 the hydraulic actuator is configured as an annular cylinder 12 installed in series with the spring 3.

The assembly including the spring 3 and the cylinder 12 can replace the plain spring of a shock absorber with no adjustment, therefore the shock absorber assembly 1 according to the present invention can also be considered or sold as an upgrade or retrofit of existing shock absorbers without height adjustment.

Also in the case of a telescopic fork for motorcycles, the spring and pusher assembly according to the present invention can replace the plain spring provided in each slider of a pre-existing fork and therefore constitute an update or retrofit of a pre-existing telescopic fork.

Clearly, the shock absorber assembly with adjustable height according to the present invention can also be used as original equipment in newly produced vehicles.

FIG. 2 illustrates, in section, the cylinder 12 which comprises a sleeve 13, a hollow portion 14 fixed to the sleeve 13 and a piston 15 sliding in a sealed manner within the hollow portion 14; the cylinder 12 can therefore be inserted on an pre-existing shock absorber by replacing a portion of the preceding spring, the sleeve 13 must have an inside diameter corresponding to the outside diameter of the pre-existing shock absorber.

The source 7 of pressurised hydraulic fluid is connected directly to the pusher 6, without intermediate valves, by means of a pipe 16.

The pipe 16 in turn communicates in a fluid manner with the cylinder 12 of the pusher 6; to this end, the pipe 16 is fixed to a hydraulic connection 18 communicating with the internal chamber of the cylinder 12.

It should be noted that, thanks to the direct connection between the source 7 of pressurised hydraulic fluid and the pusher 6, the shock absorber assembly 1 according to the present invention is simpler, lighter, cheaper and more reliable than known solutions which comprise one or more solenoid valves.

As indicated above, the cylinder 12 is a single-acting cylinder which is actively actuated by the hydraulic fluid only to increase the preload of the spring 3; in the event that the preload of the spring 3 must be reduced or cancelled when the vehicle is lowered, it is the same spring 3 which causes the hydraulic fluid to be emptied from the internal chamber of the cylinder 12 by pushing on piston 15 of the cylinder itself.

Since the cylinder 12 is of the single-acting type, the constructive form of the cylinder 12 is particularly simple, lightweight, reliable and low cost to produce.

The source 7 of hydraulic fluid comprises a hydraulic pump 19 powered by an electric motor unit 20.

The hydraulic pump 19 comprises a single-acting hydraulic cylinder (see FIG. 2) with a piston 21 sliding in a sealed manner within said hydraulic cylinder and operated in a linear manner in both directions within the stroke limits of the same piston 21, by means of the electric motor assembly 20.

The hydraulic pump 19 thus implemented is therefore simple, light, reliable and cheap to build.

According to what is illustrated in FIG. 2, the aforementioned motor assembly 20 comprises an electric motor 22 of the rotary type, a possible reduction unit 23, for example a planetary gear reduction unit, and a mechanism 24 for converting the rotary motion of the electric motor 22 into linear motion, the linear movement then causes the piston 21 to move, and an electrical connection 25 is also provided for the electric motor 22.

The aforesaid constructive form with an electric motor 22 of the rotary type, a possible reduction unit 23, for example a planetary gear reduction unit, and a mechanism 24 for converting the rotary motion of the electric motor 22 into linear motion, allows, power being equal, to use a small and lightweight electric motor and to obtain limited footprint. The mechanism 24 for converting rotary motion into linear motion can be implemented in different ways, for example: a toothed wheel that engages on a rack, a thrust crank mechanism, a cam and a follower, and in particular, a mechanism formed by a screw 25 and a nut screw 26 in operative connection to each other.

As illustrated in FIG. 2, it can be noted that the screw 25 is connected to the electric motor 22, while the nut screw 26 is connected to the piston 21, even if of course, these elements 25, 26 could be mutually exchanged.

A direct connection is thus implemented between the pump 19 and the cylinder 12 of the hydraulic type, similar to the hydraulic actuation devices of the brakes or the clutch of a motor vehicle.

In this way, it is possible to position the output of the piston 21 of the cylinder 12 in a millimetric manner by controlling the rotation of the screw 25 of the motor assembly 20; as mentioned above, actuation occurs both in one direction and in the other within the limits set by the stroke of the piston 21.

An important characteristic of the present invention is that the shock absorber assembly with adjustable height 1 comprises an accumulator tank assembly 27 in fluid connection with the cylinder 12 of the pusher 6 by means of a second pipe 17 fixed to the hydraulic connection 18 of the cylinder 12.

The accumulator tank assembly 27 in turn comprises at least one tank 28, at least one low-pressure accumulation chamber 29 which can consist of a device with a membrane 30 charged with gas or a device comprising an assembly with hydraulic fluid separator and mechanical spring (not shown) and at least one solenoid valve 31, with two positions, which controls the opening or closing of the hydraulic fluid inlet/outlet port. By opening the solenoid valve 31, the accumulator tank assembly 27 allows any pressure present in the pusher 6 to be quickly discharged, causing an immediate release of the spring preload of the shock absorber and consequently, a lowering of the vehicle.

The solenoid valve 31 is built to comprise a large section port with reduced pressure drops for the hydraulic fluid, so as to offer low resistance to the discharge of the hydraulic fluid which is in the cylinder 12 of the pusher 6, allowing for quick lowering of the vehicle.

In the event that the solenoid valve 31 is closed, the shock absorber assembly 1 operates in a conventional way since the hydraulic fluid present inside the circuit is entirely contained in the hydraulic line which includes the hydraulic pump 19, the pipe 16 and the cylinder 12 of the pusher 6.

In this way, it is possible to adjust the preload of the spring 3 and therefore the height of the vehicle under load with very precise positioning control.

When sudden lowering of the vehicle is necessary, starting from any height position of the vehicle, e.g. from any preload position of the spring 3 greater than the minimum preload condition of the spring 3, the solenoid valve 31 opens to allow a quick discharge of the hydraulic fluid from the cylinder 12 of the pusher assembly 6 towards the accumulator tank assembly 27, moving the supporting position PI or P2 of the spring 3, so as to obtain a shortening of the length under load of the shock absorber 2.

At this point, that is, after carrying out the aforementioned fast discharge of hydraulic fluid, while still keeping the solenoid valve 31 open, the hydraulic pump 19 draws the hydraulic fluid from the tank assembly 27 returning to the position in which the piston 21 determines the minimum preload, i.e. the piston 21 is pulled back, drawing the hydraulic fluid from the tank assembly 27 towards the main circuit comprising the same hydraulic pump 19, the pipe 16 and the cylinder 12 of the pusher 6.

The emptying of the accumulator tank 28 is also helped by the pressure of the accumulation chamber 29, however the aforementioned pressure must have a not too high value because it must allow the complete discharge of the cylinder 12 of the pusher 6, normally the pressure of the accumulation chamber 29 is between 2 and 4 bars. i.e. 0.2-0.4 MPa.

Figure 4:
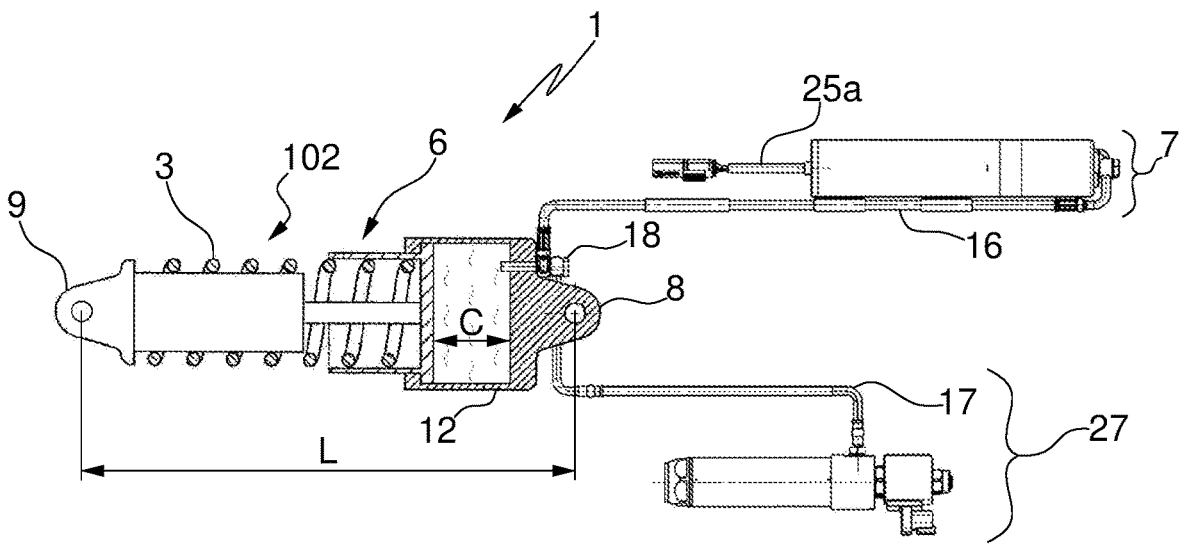
FIG. 4 is a schematic front view of another version of a shock absorber assembly with adjustable height according to the present invention.

When the hydraulic pump 19 has returned to its minimum preload position, the solenoid valve 31 closes and the shock absorber assembly 1 is ready for another operating cycle. According to a second version of the present invention illustrated in FIG. 4, a shock absorber 102 is equipped with a pusher 6, comprising a hydraulic cylinder 12 which has a displacement stroke C, the pusher 6 being located at either end of the shock absorber 102 where the couplings 8, 9 of the shock absorber 102 to the vehicle suspension are located.

The other components of the shock absorber assembly with adjustable height 1 according to this version are the same as in the preceding version and will not be described further. The effect of introducing hydraulic fluid into—or emptying hydraulic fluid from—the hydraulic cylinder 12 is to adjust the stroke C of the cylinder 12 and consequently, directly the loaded length of the shock absorber 102, and not the preload of the spring 3 like in the preceding version.

The effect and operation of the shock absorber assembly with adjustable height 1 of this version are quite similar to those of the preceding version: by operating the pusher 6 the length of the shock absorber 102 increases, due to the stroke C available from the hydraulic cylinder 12 and consequently the height of the vehicle increases, even if the shock absorber 102 is normally under load and therefore, the shock absorber 102 has a shorter length than the nominal length L.

Naturally, by decreasing (or setting to zero) the stroke C available from the hydraulic cylinder 12, the height of the vehicle also decreases because the length under load of the shock absorber 102 is reduced.

Figure 5:
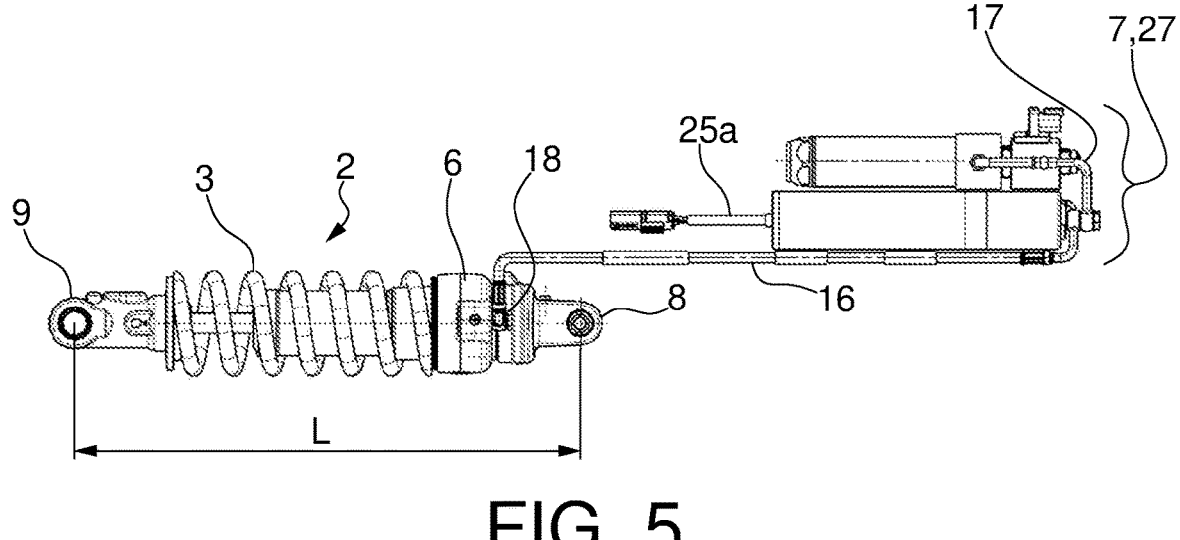
FIG. 5 is a schematic front view of a further version of a shock absorber assembly with adjustable height according to the present invention.

According to a third version of the present invention illustrated in FIG. 5, the accumulator tank assembly 27 is integrated in the source 7 of pressurised hydraulic fluid, i.e. the accumulator tank assembly 27, the hydraulic pump 19 and the motor assembly 20 constitute a single unit, the second pipe 17 is much shorter in length and can also be eliminated altogether since the accumulator tank assembly 27 is located very close to the outlet of the hydraulic pump 19 or is integral with it.

In this third version of the present invention, the integration of the components 7, 27 allows some weight reduction and quicker installation of these components on the vehicle, while in the first version of the present invention, the separation of the components 7, 27 can help finding available space on the vehicle as these components can be placed in different positions.

Also for this third version, the other components, in particular the shock absorber 2, remain the same as those of the first version of the present invention; alternatively it is possible to use the shock absorber 102 of the second version described above.

It has thus been seen how the invention achieves the intended purposes.

Various modifications and variations can be made in the invention thus conceived, without departing from the scope of the invention.

Moreover, all the elements can be replaced with other technically equivalent elements.

In practice, the materials used as well as the contingent shapes and dimensions can vary greatly according to needs, without thereby departing from the scope of protection of the following claims.

The invention claimed is:

1. A shock absorber assembly with adjustable height for a two-, or three-, or four-wheels leaning motor vehicle, said leaning motor vehicle including at least a suspension, comprising a shock absorber having a nominal length, including a spring, at least two couplings operatively connected to said suspension of the leaning motor vehicle, said spring having a first end and a second end, at least one hydraulic fluid pusher including a cylinder with an internal chamber installed in series with the spring, said pusher acting on either one of the two ends of the spring or said pusher acting on one of the two couplings, a source of pressurized hydraulic fluid in direct fluid connection with said pusher without any intermediate valves by means of a pipe in order to actuate said pusher, wherein the pipe in turn communicates in a fluid manner with the cylinder of the pusher, and wherein the pipe is fixed to a hydraulic connection communicating with the internal chamber of the cylinder, an accumulator tank assembly in fluid connection with the internal chamber of the cylinder of said pusher by means of a second pipe fixed to the hydraulic connection of the cylinder, said accumulator tank assembly in turn including at least one tank and at least one solenoid valve which controls the opening or closing of the inlet/outlet opening of the hydraulic fluid of said tank, said solenoid valve being provided with a large-section port and reduced pressure drops for the hydraulic fluid, so as to allow quick discharge of the hydraulic fluid present in the pusher towards said tank and causing an immediate release of the preload of the spring of the shock absorber or an immediate reduction of the loaded length of the shock absorber and therefore an immediate lowering of said leaning motor vehicle.

2. The shock absorber assembly according to claim 1, wherein said accumulator tank assembly comprises at least one of a device with a membrane loaded with gas, or a device comprising a set composed of a hydraulic fluid separator and a mechanical spring.

3. The shock absorber assembly according to claim 1, wherein said source of pressurized hydraulic fluid comprises a single-acting hydraulic pump which is motor-driven via an electric motor unit.

4. The shock absorber assembly according to claim 3, wherein said motor assembly comprises a rotary type electric motor providing a rotary motion, a reducer and a mechanism to convert the rotary motion provided by the electric motor into linear motion.

5. The shock absorber assembly according to claim 4, wherein said mechanism to convert the rotary motion into linear motion comprises a mechanism formed by a screw and a nut screw in operative connection with each other.

6. A drive method of the shock absorber assembly with adjustable height for two-, or three-, or four-wheels leaning motor vehicle according to claim 1, the method comprising the steps of:

providing a shock absorber assembly with adjustable height for the two-, or three-, or four-wheels leaning motor vehicle, according to claim 1;

adjusting the preload of the spring or the length of the shock absorber and thus adjusting the height of the loaded vehicle between a minimum preload position of the spring, or minimum length of the shock absorber, and a maximum preload position of the spring, or maximum length of the shock absorber;

opening the solenoid valve to allow for a fast discharge of the hydraulic fluid from the cylinder of the pusher assembly towards the accumulator tank assembly, if a sudden lowering of the vehicle becomes necessary starting from any height position of the vehicle;

maintaining the solenoid valve open; and recalling the hydraulic fluid from the tank assembly towards the source of pressurized hydraulic fluid and the pusher, bringing said source of pressurized hydraulic fluid back to the minimum preload position of the spring or minimum length of the shock absorber.

7. The drive method of the shock absorber assembly with adjustable height for two-, or three-, or four-wheels leaning motor vehicle according to claim 6, wherein said steps are performed in the order described in claim 6 and comprising a step of closing the solenoid valve.

8. The method of operating a shock absorber assembly with adjustable height assembly according to claim 6, wherein said source of pressurized hydraulic fluid comprises a single-acting hydraulic cylinder with a piston sliding is a fluid tight manner within said cylinder and actuated in a linear manner in both directions.

9. A kit for upgrading or retrofitting an adjustable-height shock absorber for a two-, or three-, or four-wheel leaning motor vehicle, said shock absorber having a nominal length, said shock absorber including a spring, at least two couplings operatively connected to said suspension of the leaning motor vehicle, said spring having a first end and a second end, at least one hydraulic fluid pusher including a cylinder with an internal chamber, installed in series with the spring, said pusher acting on either one of the two ends of the spring or said pusher acting on one of the two couplings, a source of pressurized hydraulic fluid in direct fluid connection with said pusher without any intermediate valves by means of a pipe in order to actuate said pusher, wherein the pipe in turn communicates in a fluid manner with the cylinder of the pusher, and wherein the pipe is fixed to a hydraulic connection communicating with the internal chamber of the cylinder, an accumulator tank assembly in fluid connection with the internal chamber of the cylinder of said pusher by means of a second pipe fixed to the hydraulic connection of the cylinder, said accumulator tank assembly in turn including at least one tank and at least one solenoid valve which controls the opening or closing of the inlet/outlet opening of the hydraulic fluid of said tank, said solenoid valve being provided with a large-section port and reduced pressure drops for the hydraulic fluid, so as to allow quick discharge of the hydraulic fluid present in the pusher towards said tank and causing an immediate release of the preload of the spring of the shock absorber or an immediate reduction of the loaded length of the shock absorber and therefore an immediate lowering of said leaning motor vehicle.

* * * * *